US008190604B2

(12) United States Patent  
Wen et al.

(10) Patent No.: US 8,190,604 B2
(45) Date of Patent: May 29, 2012

(54) USER INTENTION MODELING FOR INTERACTIVE IMAGE RETRIEVAL

(75) Inventors: Fang Wen, Beijing (CN); Xiaoou Tang, Beijing (CN)

(73) Assignee: Microsoft Corporation, Redmond, WA (US)

(*) Notice: Subject to any disclaimer, the term of this patent is extended or adjusted under 35 U.S.C. 154(b) by 519 days.

(21) Appl. No.: 12/113,014

(22) Filed: Apr. 30, 2008

(65) Prior Publication Data
US 2009/0254539 A1 Oct. 8, 2009

Related U.S. Application Data

(60) Provisional application No. 61/042,215, filed on Apr. 3, 2008.

(51) Int. Cl.
*G06F 7/10* (2006.01)
(52) U.S. Cl. .................. 707/732; 707/736
(58) Field of Classification Search ........... 707/999.005, 707/723, 732, E17.004, 915, 736
See application file for complete search history.

(56) References Cited

U.S. PATENT DOCUMENTS

| | | | |
|---|---|---|---|
| 6,285,995 B1 | 9/2001 | Abdel-Mottaleb et al. | |
| 6,408,293 B1 | 6/2002 | Aggarwal et al. | |
| 6,744,935 B2 | 6/2004 | Choi et al. | |
| 6,847,733 B2 | 1/2005 | Savakis et al. | |
| 7,065,521 B2 | 6/2006 | Li et al. | |
| 7,099,860 B1 | 8/2006 | Liu et al. | |
| 7,113,944 B2* | 9/2006 | Zhang et al. ................ | 1/1 |
| 7,240,075 B1 | 7/2007 | Nemirofsky et al. | |
| 7,624,337 B2 | 11/2009 | Sull et al. | |
| 2001/0056415 A1 | 12/2001 | Zhu et al. | |
| 2002/0136468 A1 | 9/2002 | Sun | |
| 2004/0111453 A1 | 6/2004 | Harris et al. | |
| 2004/0175041 A1* | 9/2004 | Miller ........................ | 382/190 |

(Continued)

FOREIGN PATENT DOCUMENTS

KR 0785928 7/2007

(Continued)

OTHER PUBLICATIONS

Cui, et al., "Combining Stroke-Based and Selection-Based Relevance Feedback for Content-Based Image Retrieval", at <<http://portal.acm.org/citation.cfm?id=1291304#abstract>>, ACM, 2007, pp. 329-332.

(Continued)

*Primary Examiner* — James Trujillo
*Assistant Examiner* — Soheila Davanlou
(74) *Attorney, Agent, or Firm* — Lee & Hayes, PLLC (57) ABSTRACT

A system performs user intention modeling for interactive image retrieval. In one implementation, the system uses a three stage iterative technique to retrieve images from a database without using any image tags or text descriptors. First, the user submits a query image and the system models the user's search intention and configures a customized search to retrieve relevant images. Then, the system extends a user interface for the user to designate visual features across the retrieved images. The designated visual features refine the intention model and reconfigure the search to retrieve images that match the remodeled intention. Third, the system extends another user interface through which the user can give natural feedback about the retrieved images. The three stages can be iterated to quickly assemble a set of images that accurately fulfills the user's search intention. They system can be used for image searching without text tags, can be used for initial text tag generation, or can be used to complement a conventional tagged-image platform.

20 Claims, 9 Drawing Sheets

U.S. PATENT DOCUMENTS

| | | | |
|---|---|---|---|
| 2005/0057570 A1* | 3/2005 | Cosatto et al. | 345/473 |
| 2005/0192992 A1 | 9/2005 | Reed et al. | |
| 2006/0112092 A1 | 5/2006 | Ziou et al. | |
| 2007/0104378 A1* | 5/2007 | Aguera Y Arcas | 382/232 |
| 2007/0214172 A1 | 9/2007 | Nister et al. | |
| 2007/0259318 A1 | 11/2007 | Harrison | |
| 2007/0288453 A1* | 12/2007 | Podilchuk | 707/5 |
| 2009/0125510 A1* | 5/2009 | Graham et al. | 707/5 |
| 2009/0171929 A1 | 7/2009 | Jing et al. | |
| 2010/0088342 A1 | 4/2010 | Ji et al. | |

FOREIGN PATENT DOCUMENTS

| | | |
|---|---|---|
| WO | WO9945483 A1 | 9/1999 |
| WO | WO2006005187 A1 | 1/2006 |

OTHER PUBLICATIONS

Datta, et al., "Image Retrieval: Ideas, Influences, and Trends of the New Age", at <<http://infolab.stanford.edu/~wangz/project/imsearch/review/JOUR/datta.pdf>>, ACM, pp. 65.

Kushki, et al., "Query Feedback for Interactive Image Retrieval", at <<http://ieeexplore.ieee.org/xpl/freeabs_all.jsp?arnumber=1294956>>, IEEE, vol. 14, No. 15, May 2004, pp. 644-655.

Qian, et al., "Gaussian Mixture Model for Relevance Feedback in Image Retrieval", at <<http://research.microsoft.com/asia/dload_files/group/mcomputing/2003P/ICME02-qf.pdf>>, pp. 4.

Sclaroff, et al., "Unifying Textual and Visual Cues for Content-Based Image Retrieval on the World Wide Web", at <<http://www.csai.unipa.it/lacascia/papers/cviu99.pdf>>, Academic Press, vol. 75, No. 1/2, Aug. 1999, pp. 86-98.

Zhou., et al., "Unifying Keywords and Visual Contents in Image Retrieval", at <<http://www.ifp.uiuc.edu/~xzhou2/Research/papers/Selected_papers/IEEE_MM.pdf>>, IEEE, 2002, pp. 11.

Jeong, et al., "Automatic Extraction of Semantic Relationships from Images Using Ontologies and SVM Classifiers", Proceedings of the Korean Information Science Society Conference, vol. 34, No. 1(c), Jun. 2006, pp. 13-18.

Abdel-Mottaleb, et al., "Performance Evaluation of Clustering Algorithms for Scalable Image Retrieval", retrieved on Jul. 30, 2010 at <<http://www.umiacs.umd.edu/~gopal/Publications/cvpr98.pdf>>, John Wiley—IEEE Computer Society, Empirical Evaluation Techniques in Computer Vision, Santa Barbara, CA, 1998, pp. 45-56.

Baumberg, "Reliable Feature Matching Across Widely Separated Views", retrieved on Jul. 30, 2010 at <<http://citeseerx.ist.psu.edu/viewdoc/download?doi=10.1.1.21.1666&rep=rep1&type=pdf>>, IEEE, Proceedings of Conference on Computer Vision and Pattern Recognition (CVPR), Hilton Head Island, SC, vol. 1, 2000, pp. 774-781.

Beckmann, et al., "The R*-Tree: An Efficient and Robust Access Method for Points and Rectangles", retrieved on Jul. 30, 2010 at <<http://epub.ub.uni-muenchen.de/4256/1/31.pdf>>, ACM, SIGMOD Record, vol. 19, No. 2, Jun. 1990, pp. 322-331.

Belussi, et al., "Estimating the Selectivity of Spatial Queries Using the 'Correlation' Fractal Dimension", retrieved on Jul. 30, 2010 at <<http://citeseerx.ist.psu.edu/viewdoc/download?doi=10.1.1.33.4521&rep=rep1&type=pdf>>, Morgan Kaufmann Publishers, Proceedings of International Conference on Very Large Data Bases, 1995, pp. 299-310.

Bengio, et al., "Group Sparse Coding", retrieved on Jul. 7, 2010 at <<http://books.nips.cc/papers/files/nips22/NIPS2009_0865.pdf>>, MIT Press, Advances in Neural Information Processing Systems (NIPS), 2009, pp. 1-8.

Berchtold, et al., "Fast Parallel Similarity Search in Multimedia Databases", retrieved on Jul. 30, 2010 at <<http://citeseerx.ist.psu.edu/viewdoc/download?doi=10.1.1.72.6847&rep=rep1&type=pdf>>, ACM, Proceedings of International Conference on Management of Data, Tucson, Arizona, 1997, pp. 1-12.

Berchtold, et al., "The X-Tree: An Index Structure for High-Dimensional Data", retrieved on Jul. 30, 2010 at <<http://eref.uqu.edu.sa/files/the_x_tree_an_index_structure_for_high.pdf>>, Morgan Kaufmann Publishers, Proceedings of Conference on Very Large Data Bases, Mumbai, India, 1996, pp. 28-39.

Berg, et al., "Shape Matching and Object Recognition using Low Distortion Correspondences", retrieved on Jul. 30, 2010 at <<http://citeseerx.ist.psu.edu/viewdoc/download?doi=10.1.1.128.1762&rep=rep1&type=pdf>>, IEEE Computer Society, Proceedings of Conference on Computer Vision and Pattern Recognition (CVPR), vol. 1, 2005, pp. 26-33.

Berker, et al., "Very-Large Scale Incremental Clustering", retrieved on Jul. 30, 2010 at <<http://www.google.com/search?q=Berker%2C+Very-Large+Scale+Incremental+Clustering&rls=com.microsoft:en-us:IE-SearchBox&ie=UTF-8&oe=UTF-8&sourceid=ie7&rlz=1I7ADBF>>, Mar. 2007, pp. 1-24.

Can, et al., "Concepts and Effectiveness of the Cover Coefficient Based Clustering Methodology for Text Databases", retrieved on Jul. 30, 2010 at <<http://sc.lib.muohio.edu/bitstream/handle/2374.MIA/246/fulltext.pdf?sequence=1>>, Miami University Libraries, Oxford, Ohio, Technical Report MU-SEAS-CSA-1987-002, Dec. 1987, pp. 1-45.

Datar, et al., "Locality-Sensitive Hashing Scheme Based on p-Stable Distributions", retrieved on Jul. 30, 2010 at <<http://www.cs.princeton.edu/courses/archive/spr05/cos598E/bib/p253-datar.pdf>>, ACM, Proceedings of Symposium on Computational Geometry (SCG), Brooklyn, New York, 2004, pp. 253-262.

Faloutsos, et al., "Efficient and Effective Querying by Image Content", retreived on Jul. 30, 2010 at <<http://citeseerx.ist.psu.edu/viewdoc/download?doi=10.1.1.40.9013&rep=rep1&type=pdf>>, Kluwer Academic Publishers, Hingham, MA, Journal of Intelligent Information Systems, vol. 3, No. 3-4, Jul. 1994, pp. 231-262.

Fraundorfer, et al., "Evaluation of local detectors on non-planar scenes", retrieved on Jul. 30, 2010 at <<http://citeseerx.ist.psu.edu/viewdoc/download?doi=10.1.1.59.3077&rep=rep1&type=pdf>>, Proceedings of Workshop of the Austrian Association for Pattern Recognition, 2004, pp. 125-132.

Friedman, et al., "An Algorithm for Finding Best Matches in Logarithmic Expected Time", retrieved on Jun. 29, 2010 at <<http://delivery.acm.org/10.1145/360000/355745/p209-freidman.pdf?key1=355745&key2=3779787721&coll=GUIDE&dl=GUIDE&CFID=93370504&CFTOKEN=86954411>>, ACM Transactions on Mathematical Software, vol. 3, No. 3, Sep. 1977, pp. 209-226.

Furao, et al., "A Self-controlled Incremental Method for Vector Quantization", retrieved on Jul. 3, 2010 at <<http://www.isl.titech.ac.jp/~hasegawalab/papers/shen_prmu_sept_2004.pdf>>, Japan Science and Technology Agency, Journal: IEIC Technical Report, Institute of Electronics, Information and Communication Engineers, vol. 104, No. 290, 2004, pp. 93-100.

Grauman, et al., "The Pyramid Match Kernel: Discriminative Classification with Sets of Image Features", retrieved on Jul. 30, 2010 at <<http://citeseerx.ist.psu.edu/viewdoc/download?doi=10.1.1.100.253&rep=rep1&type=pdf>>, IEEE, Proceedings of International Conference on Computer Vision (ICCV), Beijing, China, Oct. 2005, pp. 1458-1465.

Guttman, "R-Trees: A Dynamic Index Structure for Spatial Searching", retrieved on Jul. 30, 2010 at <<http://citeseerx.ist.psu.edu/viewdoc/download?doi=10.1.1.131.7887&rep=rep1&type=pdf>>, ACM, 1984, pp. 47-57.

He, et al., "An Investigation of Using K-d Tree to Improve Image Retrieval Efficiency", retrieved on Jul. 30, 2010 at <<http://www.aprs.org.au/dicta2002/dicta2002_proceedings/He128.pdf>>, Digital Image Computing Techniques and Application (DICTA), Melbourne, Australia, Jan. 2002, pp. 1-6.

He, et al., "Learning and Inferring a Semantic Space from User's Relevance Feedback for Image Retrieval", retrieved on Jul. 30, 2010 at <<http://research.microsoft.com/pubs/69949/tr-2002-62.doc>>, ACM, Proceedings of International Multimedia Conference, Juan-les-Pins, France, 2002, pp. 343-346.

Henrich, et al., "The LSD Tree: Spatial Access to Multidimensional Point and Non-Point Objects", retrieved on Jul. 30, 2010 at <<http://citeseerx.ist.psu.edu/viewdoc/download?doi=10.1.1.68.9784

&rep=rep1&type=pdf>>, Proceedings of the International Conference on Very large Data Bases, Amsterdam, 1989, pp. 45-54.

Indyk, et al., "Approximate Nearest Neighbors: Towards Removing the Curse of Dimensionality", retrieved on Jul. 30, 2010 at <<http://citeseerx.ist.psu.edu/viewdoc/download?doi=10.1.1.38.249&rep=rep1&type=pdf>>, ACM, Proceedings of Symposium on Theory of Computing, Dallas, TX, Apr. 1998, pp. 604-613.

Javidi, et al., "A Semantic Feedback Framework for Image Retrieval", retrieved on Jul. 30, 2010 at <<http://www.ijcee.org/papers/171.pdf>>, International Journal of Computer and Electrical Engineering, vol. 2, No. 3, Jun. 2010, pp. 417-425.

Katayama, et al., "The SR-Tree: An Index Structure for High-Dimensional Nearest Neighbor Queries", retrieved on Jul. 30, 2010 at <<http://citeseerx.ist.psu.edu/viewdoc/download?doi=10.1.1.64.4381&rep=rep1&type=pdf>>, ACM, Proceedings of Internaltional Conference on Management of Data, Tucson, Arizona, 1997, pp. 369-380.

Kim, et al., "A Hierarchical Grid Feature Representation Framework for Automatic Image Annotation", retrieved on Jul. 7, 2010 at <<http://ieeexplore.ieee.org/stamp/stamp.jsp?tp=&arnumber=4959786>>, IEEE Computer Society, Proceedings of International Conference on Acoustics, Speech and Signal Processing (ICASSP), 2009, pp. 1125-1128.

Lepetit, et al., "Randomized Trees for Real-Time Keypoint Recognition", retrieved on Jul. 30, 2010 at <<http://citeseerx.ist.psu.edu/viewdoc/download?doi=10.1.1.92.4902&rep=rep1&type=pdf>>, IEEE Computer Society, Proceedings of Conference on Computer Vision and Pattern Recognition (CVPR), vol. 2, 2005, pp. 775-781.

Li, et al., "An Adaptive Relevance Feedback Image Retrieval Method with Based on Possibilistic Clustering Algorithm", retrieved on Jul. 30, 2010 at <<http://ieeexplore.ieee.org/stamp/stamp.jsp?arnumber=04021676>>, IEEE Computer Society, Proceedings of International Conference on Intelligent Systems Design and Applications (ISDA), 2006, pp. 295-299.

Likas, et al., "The global k-means clustering algorithm", retrieved on Jul. 30, 2010 at <<http://www.cs.uoi.gr/~arly/papers/PR2003.pdf>>, Elsevier Science Ltd., Pattern Recognition, vol. 36, 2003, pp. 451-461.

Linde, et al., "An Algorithm for Vector Quantizer Design", retrieved on Jul. 30, 2010 at <<http://148.204.64.201/paginas%20anexas/voz/articulos%20interesantes/reconocimiento%20de%20voz/cuantificacion%20vectorial/An%20algorithm%20for%20Vector%20Quantizer%20Design.pdf>>, IEEE Transactions on Communications, vol. COM-28, No. 1, Jan. 1980, pp. 84-95.

Lindeberg, et al., "Shape-Adapted Smoothing in Estimation of 3-D Depth Cues from Affine Distortions of Local 2-D Brightness Structure", retrieved on Jul. 30, 2010 at <<http://citeseerx.ist.psu.edu/viewdoc/download?doi=10.1.1.55.5090&rep=rep1&type=pdf>>, Springer-Verlag New York, Proceedings of European Conference on Computer Vision, Stockholm, Sweden, vol. 1, 1994, pp. 389-400.

Lloyd, "Least Squares Quantization in PCM", retrieved on Jul. 30, 2010 at <<http://citeseerx.ist.psu.edu/viewdoc/download;jsessionid=8A3C215650DD1680BE51B35B421D21D7?doi=10.1.1.131.1338&rep=rep1&type=pdf>>, IEEE Transactions on Information Theory, vol. IT-28, No. 2, Mar. 1982, pp. 129-137.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Magalhaes, et al., "High-Dimensional Visual Vocabularies for Image Retrieval", retrieved on Jul. 7, 2010 at <<http://citeseerx.ist.psu.edu/viewdoc/download?doi=10.1.1.98.7027&rep=rep1&type=pdf>>, ACM, Proceedings of Conference on Research and Development in Information Retrieval, Amsterdam, NL, Jul. 27, 2007, pp. 815-816.

Mairal, et al., "Online Dictionary Learning for Sparse Coding", retrieved on Jul. 7, 2010 at <<http://www.di.ens.fr/~fbach/mairal_icml09.pdf>>, ACM, Proceedings of International Conference on Machine Learning, Montreal, CA, vol. 382, 2009, pp. 1-8.

Matas, et al., "Robust Wide Baseline Stereo from Maximally Stable Extremal Regions", retrieved on Jul. 30, 2010 at <<http://cmp.felk.cvut.cz/~matas/papers/matas-bmvc02.pdf>>, Proceedings of British Machine Vision Conference (BMVC), Cardiff, UK, 2002, pp. 384-393.

Max, "Quantizing for Minimum Distortion", retrieved on Jul. 30, 2010 at <<http://ieeexplore.ieee.org/stamp/stamp.jsp?tp=&arnumber=1057548&userType=inst>>, IEEE Transactions on Information Theory, vol. 6, No. 3, Mar. 1960, pp. 7-12.

Mehrotra, et al., "Feature-Based Retrieval of Similar Shapes", retrieved on Jul. 30, 2010 at <<http://ieeexplore.ieee.org/stamp/stamp.jsp?tp=&arnumber=344072>>, IEEE Computer Society, Proceedings of International Conference on Data Engineering, 1993, pp. 108-115.

Mikolajczyk, et al., "A Comparison of Affine Region Detectors", retrieved on Jul. 30, 2010 at <<http://citeseerx.ist.psu.edu/viewdoc/download?doi=10.1.1.108.595&rep=rep1&type=pdf>>, Kluwer Academic Publishers Hingham, MA, International Journal of Computer Vision, vol. 65, No. 1-2, 2005, pp. 43-72.

Mikolajczyk, et al., "A performance evaluation of local descriptors", retrieved on Jul. 30, 2010 at <<http://www.ai.mit.edu/courses/6.891/handouts/mikolajczyk_cvpr2003.pdf>>, IEEE Computer Society, Transactions on Pattern Analysis and Machine Intelligence, vol. 27, No. 10, 2005, pp. 1615-1630.

Mikolajczyk, et al., "Scale and Affine Invariant Interest Point Detectors", retrieved on Jul. 30, 2010 at <<http://www.robots.ox.ac.uk/~vgg/research/affine/det_eval_files/mikolajczyk_ijcv2004.pdf>>, Kluwer Academic Publishers, The Netherlands, International Journal of Computer Vision, vol. 60, No. 1, 2004, pp. 63-86.

Murthy, et al., "Content Based Image Retrieval using Hierarchical and K-Means Clustering Techniques", retrieved on Jul. 30, 2010 at <<http://www.ijest.info/docs/IJEST10-02-03-13.pdf>>, International Journal of Engineering Science and Technology, vol. 2, No. 3, 2010, pp. 209-212.

Nister, et al., "Scalable Recognition with a Vocabulary Tree", retrieved on Jul. 7, 2010 at <<http://citeseerx.ist.psu.edu/viewdoc/download?doi=10.1.1.61.9520&rep=rep1&type=pdf>>, IEEE Computer Society, Proceedings of Conference on Computer Vision and Pattern Recognition (CVPR), vol. 2, 2006, pp. 2161-2168.

Obdrzalek, et al., "Sub-linear Indexing for Large Scale Object Recognition", retrieved on Jul. 30, 2010 at <<http://cmp.felk.cvut.cz/~matas/papers/obdrzalek-tree-bmvc05.pdf>>, Proceedings of the British Machine Vision Conference (BMVC), London, UK, vol. 1, Sep. 2005, pp. 1-10.

Patane, et al., "The Enhanced LBG Algorithm", retrieved on Jul. 30, 2010 at <<http://www.google.com.sg/url?sa=t&source=web&cd=1&ved=0CBcQFjAA&url=http%3A%2F%2Fciteseerx.ist.psu.edu%2Fviewdoc%2Fdownload%3Fdoi%3D10.1.1.74.1995%26rep%3Drep1%26type%3Dpdf&rct=j&q=The%20enhanced%20LBG%20algorithm&ei=QXpSTOyFEoyevQOQ35Qa&usg=AFQjCNGkfxm5Kgm4BalKO42_FpgsDADtyw>>, Pergamon, Neural Networks, vol. 14, 2001, pp. 1219-1237.

Rothganger, et al., "3D Object Modeling and Recognition Using Local Affine-Invariant Image Descriptors and Multi-View Spatial Constraints", retrieved on Jul. 30, 2010 at <<http://www-cvr.ai.uiuc.edu/ponce_grp/publication/paper/ijcv04d.pdf>>, Kluwer Academic Publishers Hingham, MA, International Journal of Computer Vision, vol. 66, No. 3, Mar. 2006, pp. 231-259.

Samet, "The Quadtree and Related Hierarchical Data Structure", retrieved on Jul. 30, 2010 at <<http://citeseerx.ist.psu.edu/viewdoc/download?doi=10.1.1.75.5407&rep=rep1&type=pdf>>, ACM, Computing Surveys, vol. 16, No. 2, Jun. 1984, pp. 187-260.

Sawhney, et al., "Efficient Color Histogram Indexing", retrieved on Jul. 30, 2010 at <<http://ieeexplore.ieee.org/stamp/stamp.jsp?tp=&arnumber=413532>>, IEEE, Proceedings of International Conference on Image Processing (ICIP), Austin, TX, vol. 2, Nov. 1994, pp. 66-70.

Schmid, et al., "Evaluation of Interest Point Detectors", retrieved on Jul. 30, 2010 at <<http://cs.gmu.edu/~zduric/cs774/Papers/Schmid-Evaluation-IJCV.pdf>>, Kluwer Academic Publishers, The Netherlands, International Journal of Computer Vision, vol. 37, No. 2, 2000, pp. 151-172.

Sellis, et al., "The R+-Tree: A Dynamic Index for Multidimensional Objects", retrieved on Jul. 30, 2010 at <<http://www.vldb.org/conf/1987/P507.PDF>>, Proceedings of the Conference on Very Large Data Bases, Brighton, 1987, pp. 507-5181.

Sivic, et al., "Video Google: A Text Retrieval Approach to Object Matching in Videos", retrieved on Jul. 30, 2010 at <<http://www.robots.ox.ac.uk/~vgg/publications/papers/sivic03.pdf>>, IEEE Computer Society, Proceedings of International Conference on Computer Vision (ICCV), vol. 2, 2003, pp. 1-8.

Sproull, "Refinements to Nearest-Neighbor Searching in k-Dimensional Trees", retrieved on Jul. 30, 2010 at <<http://www.google.co.in/url?sa=t&source=web&cd=1&ved=0CBUQFjAA&url=http%3A%2F%2Ftrac.astrometry.net%2Fexport%2F13048%2Ftrunk%2Fdocuments%2Fpapers%2Fdstn-review%2Fpapers%2Fsproull1991.pdf&rct=j&q=Refinesments%20to%20nearest-%20neighbor%20searching%20in%20k-dimensional%20trees&ei+32 oXVSTOuFIZO4sQOjoM3RBQ&usg=AFQjCNEP1sD7vWoqQk80zCTpamR2XWSqWg>>, Springer-Verlag.

Tuytelaars, et al., "Matching Widely Separated Views Based on Affine Invariant Regions", retrieved on Jul. 30, 2010 at <<http://www.vis.uky.edu/~dnister/Teaching/CS684Fa112005/tuytelaars_ijcv2004.pdf>>, Kluwer Academic Publishers, The Netherlands, International Journal of Computer Vision, vol. 59, No. 1, 2004, pp. 61-85.

van Rijsbergen, "Information Retrieval", Butterworth-Heinemann, 1979, pp. 1-151.

White, et al., "Similarity Indexing: Algorithms and Performance", retrieved on Jul. 30, 2010 at <<http://citeseerx.ist.psu.edu/viewdoc/download?doi=10.1.1.48.5758&rep=rep1&type=pdf>> Proceedings of Conference on Storage and Retrieval for Image and Video Databases (SPIE), vol. 2670, San Jose, CA, 1996, pp. 62-75.

Yang, et al., "Linear Spatial Pyramid Matching Using Sparse Coding for Image Classification", retrieved on Jul. 7, 2010 at <<http://www.ifp.illinois.edu/~jyang29/papers/CVPR09-ScSPM.pdf>>, IEEE Computer Society, Conference on Computer Vision and Pattern Recognition (CVPR), 2009, Miami, FLA, pp. 1-8.

Yu, et al., "Adaptive Document Clustering", retrieved on Jul. 30, 2010 at <<http://74.125.155.132/scholar?q=cache:nleqYBgXXhMJ:scholar.google.com/&hl=en&as_sdt=2000>>, ACM, Proceedings of International Conference on Research and Development in Information Retrieval, Montreal, Quebec, 1985, pp. 197-203.

The Extended European Search Report mailed Aug. 11, 2011 for European patent application No. 09755475.2, 9 pages.

Gevers, et al., "The PicToSeek WWW Image Search System", Proceedings of the IEEE International Conference on Multimedia Computing and Systems, vol. 1, Jun. 7, 1999, Florence, Italy, pp. 264-269.

Qi, et al., "Image Retrieval Using Transaction-Based and SVM-Based Learning in Relevance Feedback Sessions", Image Analysis and Recognition; (Lecture Notes in Computer Science), Aug. 22, 2007, Heidelbert, Berlin, pp. 638-649.

Torres, et al., "Semantic Image Retrieval Using Region-Base Relevance Feedback", Adaptive Multimedia Retrieval: User, Context, and Feedback (Lecture Notes in Computer Science; LNCS), Heidelberg, Berlin, pp. 192-206.

Yang, et al., "Learning Image Similarities and Categories from Content Analysis and Relevance Feedback", Proceedings ACM Multimedia 2000 Workshops, Marina Del Rey, CA, Nov. 4, 2000, vol. CONF. 8, pp. 175-178.

* cited by examiner

USER INTENTION MODELING FOR INTERACTIVE IMAGE RETRIEVAL

RELATED APPLICATIONS

This application claims priority to U.S. Provisional Patent Application No. 61/042,215 to Wen et al., entitled, "User Intention Modeling for Interactive Image Retrieval," filed Apr. 3, 2008, and incorporated herein by reference.

BACKGROUND

Content-based Image Retrieval (CBIR) has been extensively studied in recent years due to the explosive growth of online and offline image databases. Researchers in a number of different research areas have developed CBIR using different approaches.

Researchers in the computer vision and machine learning areas tend to focus on fully automatic approaches that aim to train computers to automatically understand image content. Typical approaches include region-based image retrieval, image attention detection, and multi-instance learning. However, due to the extreme diversity of general image content, the computational cost, and the low-level nature of most vision-based image understanding algorithms, fully automatic CBIR is far from being a real application.

Researchers in the multimedia processing community have taken a less ambitious approach by involving human interaction in the image searching process. One notable approach is the relevance feedback algorithm. It allows users to label positive and negative samples in order to iteratively improve the search results. This approach can indeed improve the search performance in some cases because of the human involvement.

Unfortunately, the improvement is often limited and outweighed by the added trouble of manually labeling many samples. Like computer vision-based approaches, research on improving relevance feedback has focused on improving the feature extraction and automatic learning algorithms on the feedback samples. Inevitably, these approaches hit a similar bottleneck as the vision-based approaches, such as computational cost and the problem of using low-level features to describe high-level semantic content.

The difficulties with CBIR and the intense demand for image search applications, especially for the Internet, have led commercial companies to take a different route to image searching/text-based image searching. Most current conventional image search engines take advantage of the cognitive ability of human beings by letting the human user label images with tags, and then conduct a text-based image search. This is a rather practical approach that can generate immediate results, but with great limitations. The acquisition of image tags, though it can be assisted by image metadata such as surrounding text and search annotations, can hardly obtain satisfactory results without brute force human labeling. Moreover, for large existing stock image collections and personal desktop photos, there is no surrounding text to assist the search. More importantly, images naturally contain much richer information than text, and thus can hardly be well represented by text alone. There is a great gap between text description and image content. The cliché "an image is worth a thousand words" is unfortunately true in most image search situations. Thus current text-based search results are far from satisfactory.

SUMMARY

A system performs user intention modeling for interactive image retrieval. In one implementation, the system uses a three stage iterative technique to retrieve images from a database without using any image tags or text descriptors. First, the user submits a query image and the system models the user's search intention and configures a customized search to retrieve relevant images. Then, the system extends a user interface for the user to designate visual features across the retrieved images. The designated visual features refine the intention model and reconfigure the search to retrieve images that match the remodeled intention. Third, the system extends another user interface through which the user can give natural feedback about the retrieved images. The three stages can be iterated to quickly assemble a set of images that accurately fulfills the user's search intention. They system can be used for image searching without text tags, can be used for initial text tag generation, or can be used to complement a conventional tagged-image platform.

This summary is provided to introduce the subject matter of user intention modeling for interactive image retrieval, which is further described below in the Detailed Description. This summary is not intended to identify essential features of the claimed subject matter, nor is it intended for use in determining the scope of the claimed subject matter.

DESCRIPTION

Overview

This disclosure describes user intention modeling for interactive image retrieval. Instead of conventional techniques that try to retrieve images from the Internet or from a large database based on a descriptive text tag, the exemplary image retrieval system described herein turns the search focus first toward the user, and aims to provide accurate image retrieval by working through a refinement of the user's intention in seeking an image, i.e., modeling the visual details of what the user "has in mind." This simple change in focus from object to user has dramatic implications for the efficacy of image search and retrieval.

In one implementation, the exemplary system employs three interactive methods, components, or stages to allow the searching device to better capture the user's intention during content-based image retrieval. First, an exemplary "intention list" user interface (UI) induces a coarse determination of user intention, thereby breaking the search task down into smaller pieces, and narrowing the search space. Second, another exemplary interactive UI allows the user to draw multiple reference strokes on one or more images to specify user intention in detail, by being able to point out visual features or image aspects. The second exemplary method can combine clues from multiple examples to refine the intention results. Third, natural user feeding through associated UI's is utilized to collect both long-term and short term user relevance feedback data to boost the performance of the exemplary image retrieval system.

In one implementation, the three exemplary stages just introduced are iterative and synergy between the three interactive mechanisms improves search efficiency, reduces user workload, and improves user experience. One advantage of the exemplary system is that the interacting mechanisms accommodate users with different expectations and intentions. Consequently the exemplary system greatly improves search efficiency and user experience across a broad spectrum of users. Exemplary UI designs also significantly improve the image retrieval performance.

Significantly, the exemplary intention-based image retrieval system does not need to use any text tags or descriptive metadata. But on the other hand, the exemplary system can also be a powerful complement for conventional tag-based search systems, and provide functionality that boosts user experience to a level that seems impossible by conventional methods that are purely text-based.

The exemplary system can also be used to accumulate or analyze image tags. For example, the exemplary system can help conventional tag-based systems to start from no tags at all, and gradually obtain tags through search-based annotation. In another scenario, the exemplary system can be used to post-process tag-based image search algorithms, to allow the user to handle ambiguous and noisy web image search results by simple interaction, which can greatly improve the user's experience of web-based image search engines.

The exemplary user intention modeling described herein provides a quantifiable and principled approach to user intention modeling and applies the intention model to image retrieval.

Exemplary System

Figure 1:
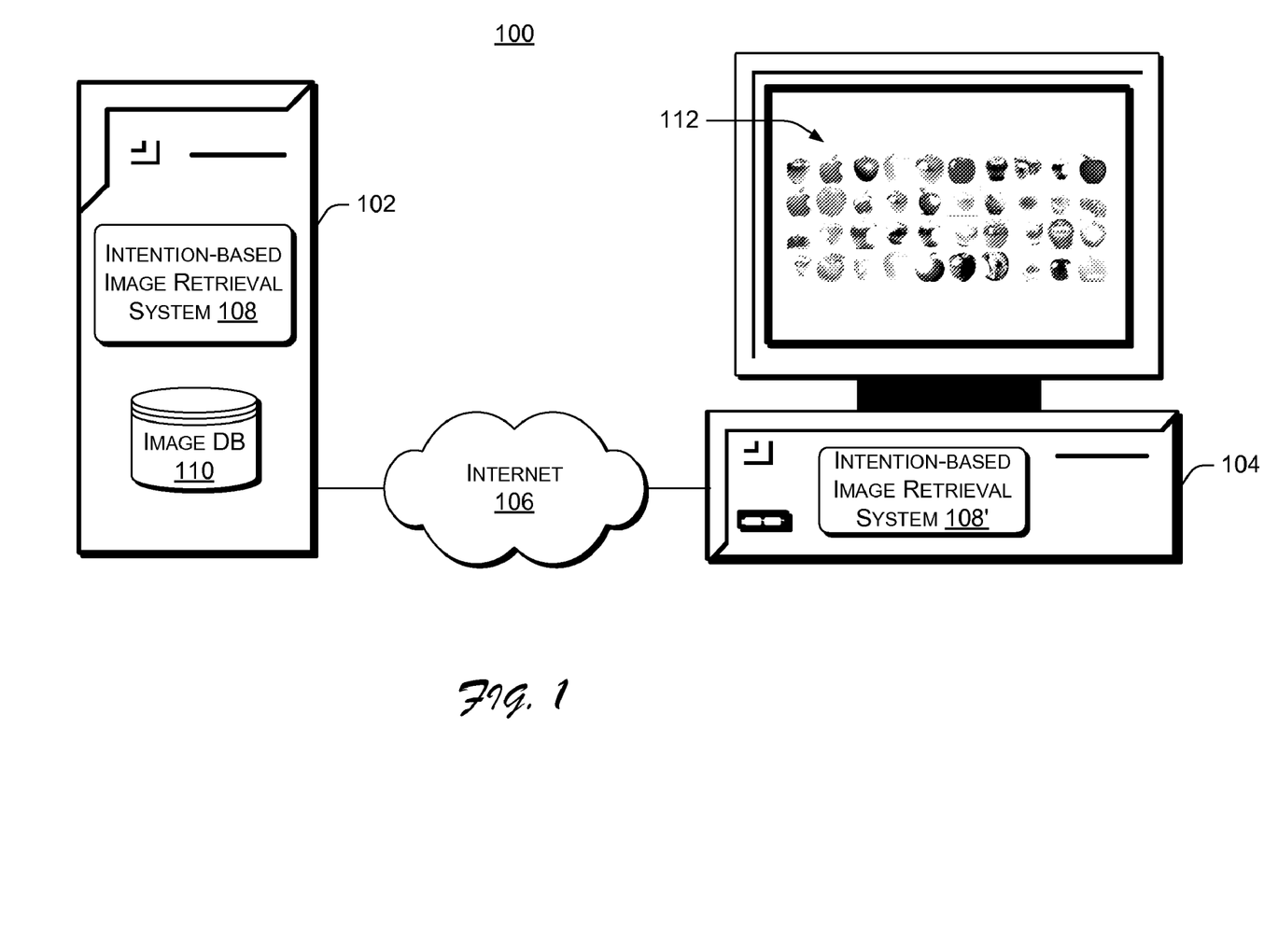
FIG. 1 is a diagram of an exemplary image retrieval framework.

FIG. 1 shows an exemplary image retrieval framework 100 in which the image retrieval is based on modeling user intention. The image retrieval framework can be implemented on a single, standalone computing device, however a preferred distributed version is shown. A server 102 communicates with a user's (client) computing device 104 via the Internet 106 (or other network). The server 102 and the computing device 104 can be a desktop, notebook, or mobile computer, i.e., possessing a processor, memory, data storage, operating system, and other typical computer components. The server 102 hosts an exemplary intention-based image retrieval system 108. The client computing device 104 also hosts an instance of the intention-based image retrieval system 108' or components of a distributed version of the intention-based image retrieval system 108'.

The intention-based image retrieval system 108 includes components to create an indexed image database 110, obtaining images from available sources such as the Internet 106 or local filing systems and storage media. The image database 110 can exist on one or both of the server 102 and the client computing device 104, or can exist in a distributed manner on a network.

At the user's computing device 104, the exemplary intention-based image retrieval system 108' deploy exemplary user interfaces (UI's) 112 that receive user input to iteratively model the user's intention in seeking an image. In one implementation, each stage of the modeling uses one or more associated UI's 112. The exemplary UI's 112 introduce respective interactive mechanisms at different levels of user-intention refinement to shorten the distance between the raw image database 110 and the user-specified image query target.

Exemplary Engines

Figure 2:
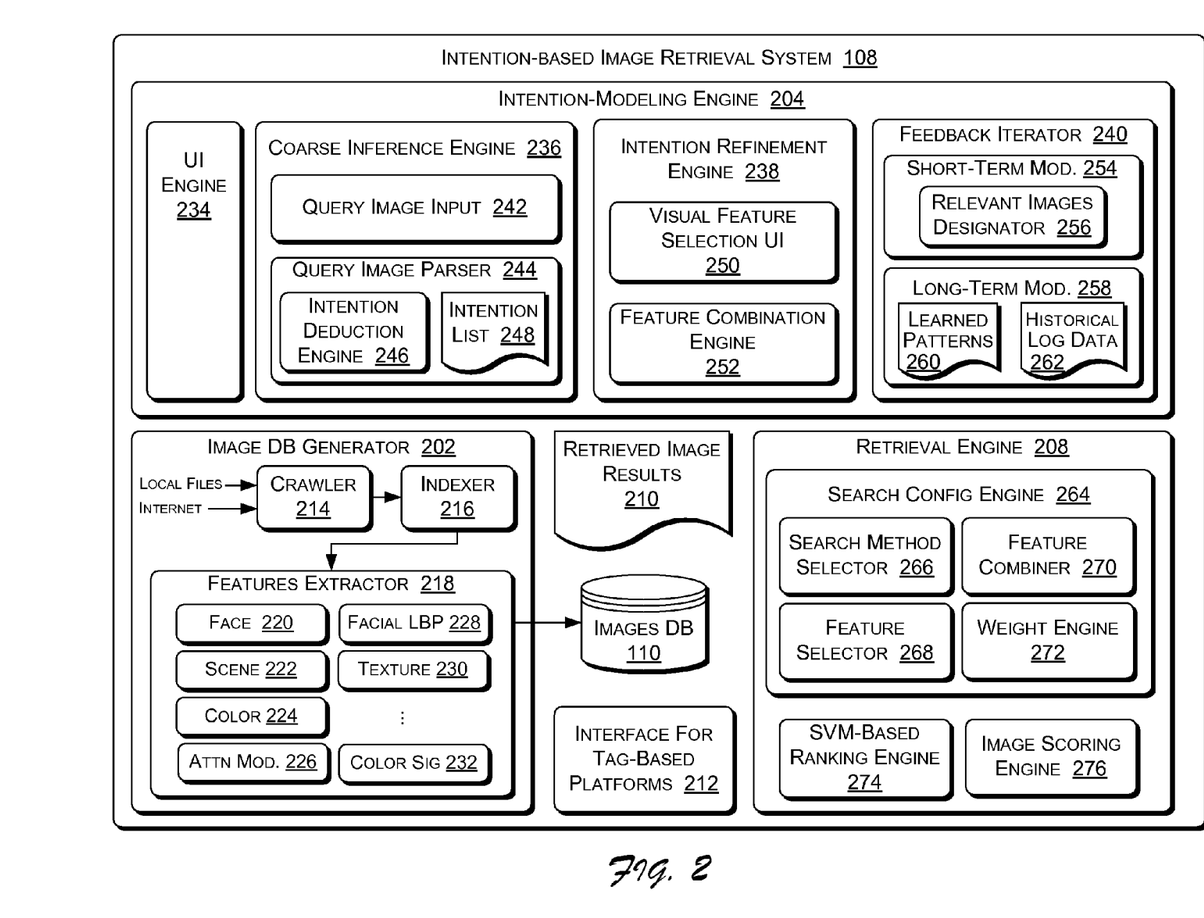
FIG. 2 is a block diagram of an exemplary intention-based image retrieval system.

FIG. 2 shows an example implementation of the intention-based image retrieval system 108 of FIG. 1, in greater detail. The intention-based image retrieval system 108 includes various engines that can be implemented in software and/or hardware. However, the illustrated components and configuration in FIG. 2 is only one example for the sake of description. The intention-based image retrieval system 108 can be implemented in other configurations that may include variations in the number and type of components.

Engine components are now listed. The illustrated intention-based image retrieval system 108 includes an image database generator 202, an intention-modeling engine 204, the images database 110, a retrieval engine 208, a buffer for image results 210, and an optional interface for tag-based image platforms 212 i.e., for communicating with text or tag-based image platforms.

The image database generator 202 may further include a crawler 214 to obtain images from local files or from the Internet 106, an indexer 216, and an image features extractor 218. The features extractor 218 may include various engines and filters for extracting image features, such as a face detector 220, a scene features extractor 222, a color features extractor 224, an attention modeling engine 226, a facial local binary pattern ("LBP") features extractor 228, a texture features extractor 230, . . . , and a color signature feature extractor 232. The image database generator 202 creates a feature-indexed collection of images (or image pointers, such as URLs) that constitute the images database 110.

The intention-modeling engine 204 includes a UI engine 234 to generate and manage the UI's associated with each intention modeling stage, a coarse inference engine 236 to make an initial determination of user intention, an intention refinement engine 238 to determine more subtle aspects of the user's expectations, and a feedback iterator 240 to greatly boost the accuracy of modeling the user's intention in seeking an image.

The coarse inference engine 236, in turn, includes a query image input 242 to receive an image that can be used as a search criterion, and a query image parser 244 that includes an intention deduction engine 246, that provides an initial intention assessment and places the intention assessment in the context of an intention list 248.

The intention refinement engine 238 includes a visual feature selection UI 250, which in one implementation receives graphic input such as drawing, pencil, stylus, or paintbrush strokes that specify the visual aspects and features in example images that the user intends to find in an image being retrieved. In other words, the user can designate features across one or more images that should be present in the image(s) that the user is searching for. When the user designates features across multiple images, the feature combination engine 252 combines the features into coherent image search criteria.

The feedback iterator 240 further includes a short-term module 254 that includes a relevant images designator 256 to collect user relevance feedback. For example, the relevant images designator 256 may provide a way for the user to designate a collection of images that are like the image(s) being sought. The feedback iterator 240 also has a long-term module 258 that may apply learned intention patterns 260 and historical log data 262 to the current short term user interaction with the relevant images designator 256. That is, the long-term module 258 may detect that the user relevance feedback at the short-term module 254 is beginning to resemble a learned pattern 260, and may invoke the learned pattern 260 to improve the image retrieval.

The retrieval engine 208 receives modeled user intention data from any of the three stages of the intention-modeling engine 204 and configures a search from the query image, the designated visual features, and/or the user relevance feedback from the three stages. A search configuration engine 264, therefore, includes a search method selector 266 to designate a search technique relevant to the current state of the modeled user intention, a feature selector 268 and a feature combiner 270 to form feature-based image search criteria (unless the feature combination engine 252 has already performed this task for second stage user-intention input), and a weight engine 272 to assign and prioritize an emphasis or importance to each search criterion thus created.

In one implementation, the retrieval engine 208 uses the modeled intention data and/or the search configuration data to train a support vector machine (SVM)-based ranking engine 274. The SVM-based ranking engine 274 drives an image scoring engine 276, which prioritizes image search results retrieved from the image database 110.

Operation of the Intention-based Image Retrieval System

The intention-modeling engine 204 solicits user input to iteratively model user intention as it relates to searching for and retrieving images that match the intention. In the initial query stage, the coarse inference engine 236 receives an image from the user via the query image input 242 and infers the intention of the user from the query image only. The query image parser 244 uses the intention deduction engine 246 to arrive at the most likely intentions, which are presented in the intention list 248. Generally, at this stage, no additional user effort is required to inform the intention-modeling engine 204 of user intention. The entire image semantic domain is automatically divided and narrowed down into predetermined categories, so that better search results can be obtained.

In a second stage, the visual feature selection UI 250 facilitates a multiple reference stroke interaction with the user. Multiple reference strokes provide input to handle cases in which adequate user intention cannot be expressed by the single query image. By asking the user to naturally draw strokes on multiple images at regions that the user thinks is "important", the intention-modeling engine 204 learns which aspect in each of the images should be emphasized, and how such aspects should be combined. The stroke interactions of this second stage can also be used within just a single image to refine the derived user intention arrived at in the first stage.

A third stage uses natural user feedback to help define user intention when user-submitted reference strokes in the second stage are not sufficient to describe the user intention. In one implementation, the relevant images designator 256 uses a collector, such as an "I like these" basket to enable the user to conduct relevance feedback naturally and effortlessly. As the user collects more subjectively "good" images to the basket via the feedback iterator 240, the image retrieval system 108 incrementally improves the retrieved image results 210. The long-term module 258 can leverage more data by matching the user behavior in the current session with learned patterns 260 and historical log data 262 from old sessions (which may also be from different users), using this borrowed information to help the current image search.

As the intention-modeling engine 204 iterates from the first component (the coarse inference engine 236), to the third component (the feedback iterator 240), the amount of information leveraged by the retrieval engine 208 increases dramatically, while the user effort only increases moderately.

Users have different performance needs, and therefore may choose to stop at any stage and use the current retrieved image results 210. Novices may only use the default deduced intention provided on the intention list 248 by the intention deduction engine 246 to perform a one round query, while experts may want to use the reference stroke techniques of the intention refinement engine 238 and the natural feedback feature of the feedback iterator 240 to obtain very accurate results via providing more user information.

Figure 3:
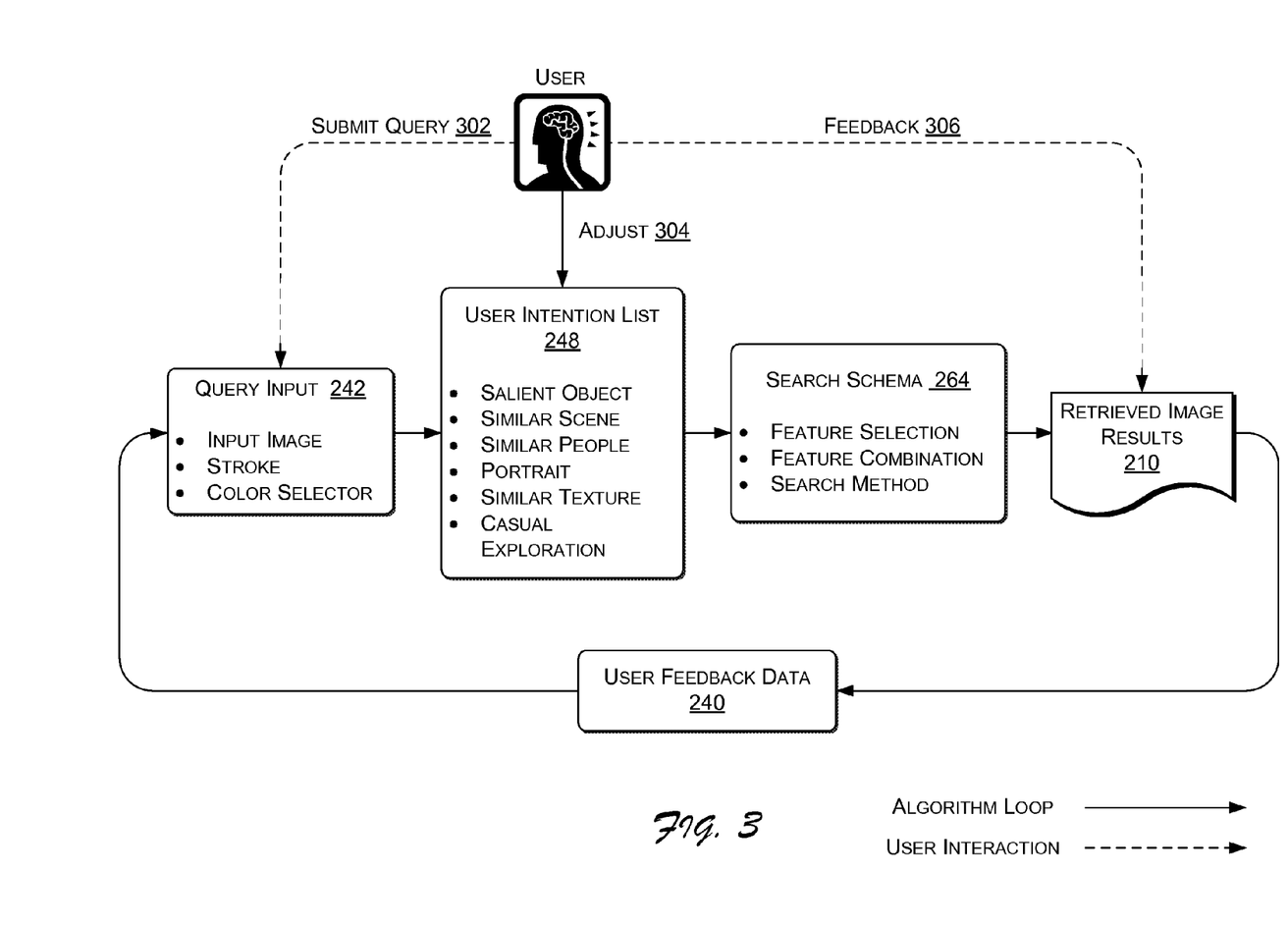
FIG. 3 is a diagram of an exemplary operational flow of the image retrieval system of FIG. 2.

FIG. 3 shows an example operational pipeline of the intention-based image retrieval system 108. The user submits a query 302 via the query image input 242 that serves as initial search criterion. The intention deduction engine 246 determines the user's most likely intention within the context of predetermined categories (shown as a user intention list 248). The user can adjust 304 the results at this stage by using multiple reference strokes to designate features. Then formation of a search schema 264 follows. Retrieved search results 210 are displayed and the user submits feedback 306 that differentiates images that are aligned with the user intention from those images that are not. An image from the user feedback 240 may be looped back to the query image input 242 to start a subsequent iteration for refining the user intention.

The operational pipeline of FIG. 3 does not use any pre-assigned image tags, text, or metadata during formation of the search schema 264. However, the exemplary image retrieval system 108 is not meant to replace tag-based image search methods. Yet, the exemplary system 108 can perform content-based image retrieval when tags are not available. Moreover, the exemplary image retrieval system 108 can easily be combined with tag-based techniques via the interface for tag-based platforms 212, to provide multimodal search results.

Determining User Intention From a Query Image

In the coarse inference engine 236, when the query intention of the user is provided via the image input 242, then even a very rough (broad or general) intention greatly simplifies the image search since the search space is greatly narrowed down to a specific domain. For example, if the user intends to find human portraits, those images without faces are easily discarded.

Conventional systems that consider user intention require the user to input categorical keywords or select from many predefined categories in order to determine a user intention. This causes the user additional effort and limits the potential image results because only a subset of the selected category is searched.

Figure 4:
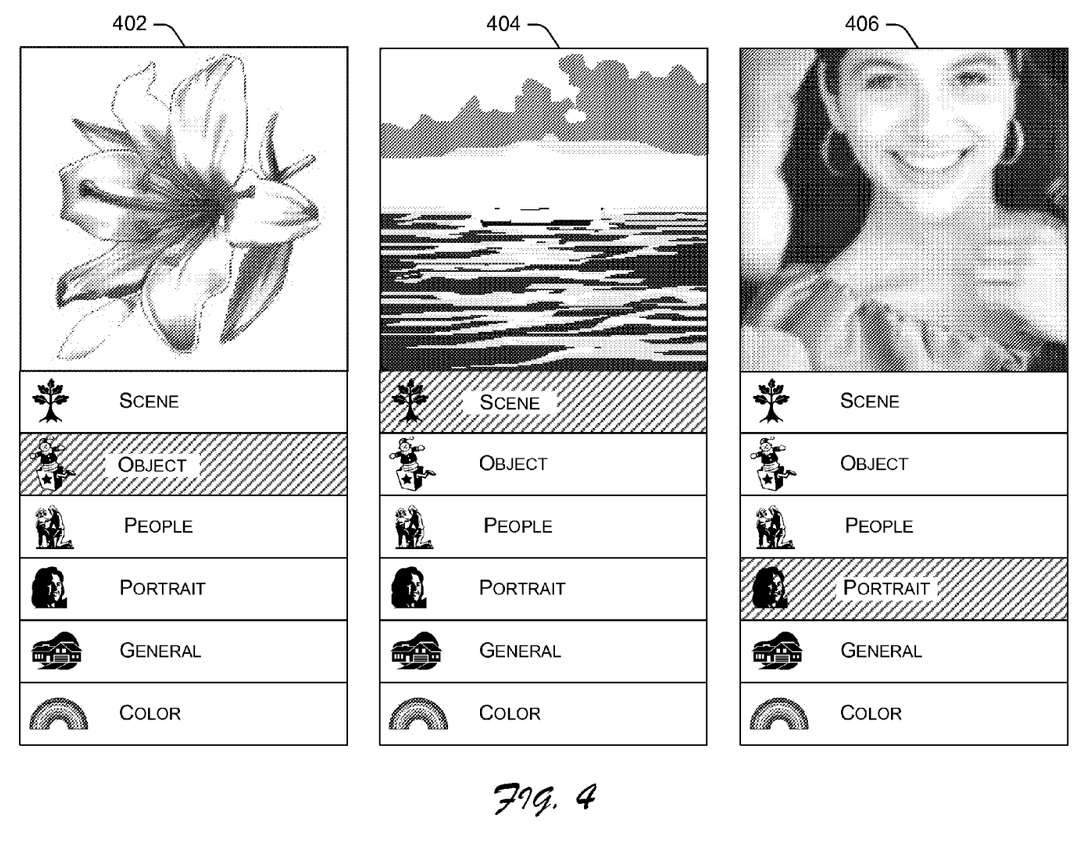
FIG. 4 is a diagram of an exemplary user interface displaying an intention modeling result on an intention list.

The intention deduction engine 246 intelligently deduces the user intention in real time after the user submits the query image, and presents the most likely intentions in the "smart" intention list 248, as shown in FIG. 4. The highlighted items in each of the shown intention lists 248 indicate the most probable intention deduced by the query image parser 244 for each query image. An experimental study has shown that the intention-modeling engine 204 deduces a correct user intention most of the time.

In most cases, it takes no additional effort on the part of the user, other than submitting the query image, for the query image parser 244 to automatically determine a correct user intention category on the intention list 248 and thereby greatly narrow down the search. For example, as shown in FIG. 4, a first image 402 that contains a salient object results in a search for an "Object"; a second image 404 with scenery results in a search for a "Scene"; and a third image 406 with a distinct face results in a search for a "Portrait".

In applied experiments, it was observed that the user only rarely needs to modify the deduced search intention, but such modification is very easily accomplished by simply clicking manually on the desired search intention on the intention list 248, as shown in FIG. 4. In one implementation, the user can click on a lock button to set the current intention, thereby fixing the search to only the selected search intention.

Each user intention in the intention list 248 is associated with a specific search schema, in which the search configuration engine 264 selects optimal search features, feature combination, and search algorithms, and can be updated with accumulated user log data 262 to provide a better user experience when retrieving images with each of the search intentions.

Figure 5:
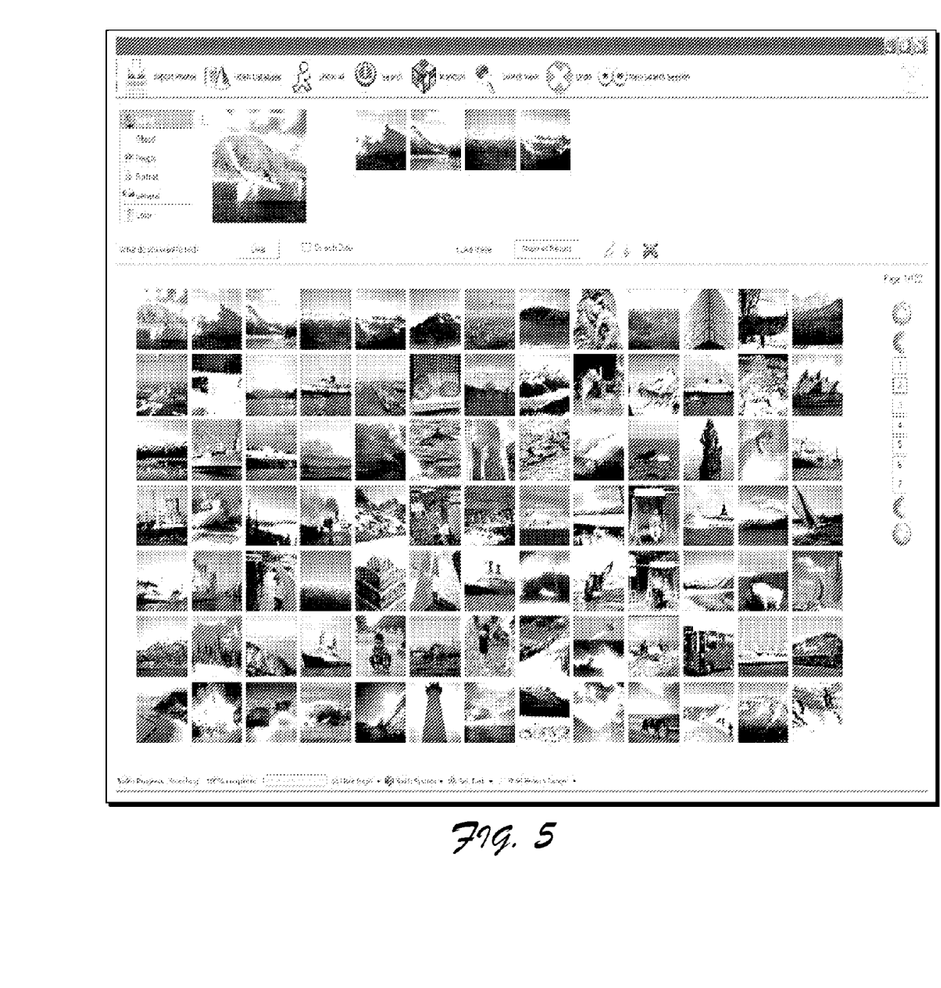
FIG. 5 is a diagram of exemplary user interface of the image retrieval system.

The user-experience of searching via the exemplary intention-based image retrieval system 108 is straightforward: the user submits a query image, and similar images are returned via the deduced intention. If the user changes the automatically proposed intention, then new retrieved image results 210 come up. The retrieved image results 210 are presented in a clean and straightforward user interface, for example, as shown in FIG. 5.

Figure 6:
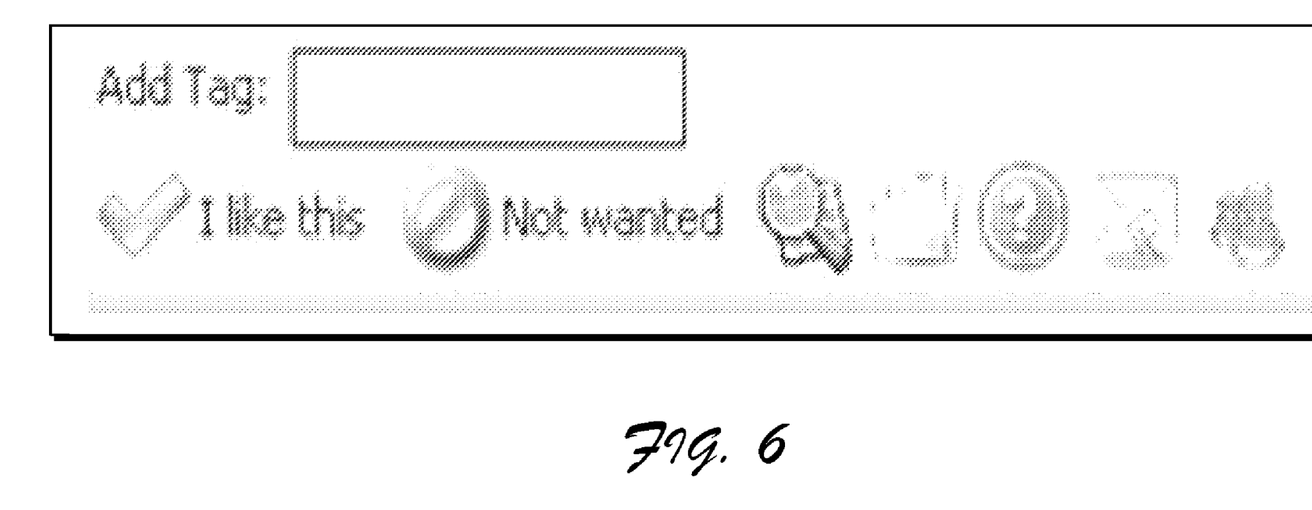
FIG. 6 is a diagram of an exemplary mini-toolbar interface for natural user feedback.

In one implementation, for each of the displayed images in the retrieved image results 210, a contextual mini-toolbar may appear when the user moves the mouse toward a specific boundary of each image, providing several functionalities related to the image, as shown in FIG. 6.

It is worth noting that the mechanism of the query image parser 244 for forming an intention list 248 is quite different from conventional selection of a fixed search category, since in the query image parser 244 the user intention can be flexibly updated while the user searches with different query images. In this manner, user searches are conducted on the entire images database 110, rather than in a subcategory of the images. The exemplary technique of searching by user intention results in each search using a different strategy to search the entire database 110 (rather than each search using a static search that searches just a categorical subset of the images).

Figure 7:
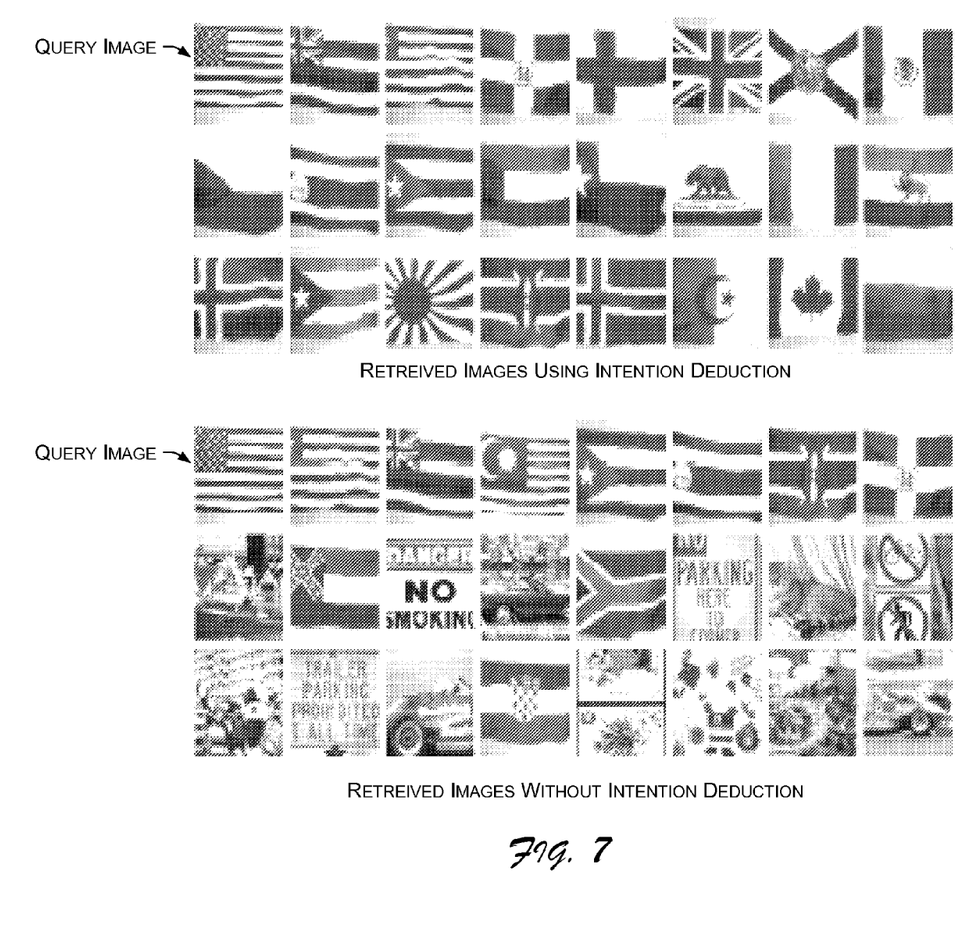
FIG. 7 is a diagram of exemplary image retrieval results with and without intention deduction.

Without the intention deduction engine 246, the retrieval engine 208 would have to perform image comparison and matching during a search using all features available, so that the aspect that the user wished to emphasize would be greatly diluted, and the search performance degraded significantly. FIG. 7 shows a comparison of the retrieved image results 210 of two searches that begin with the same query image search criterion. Using exemplary intention deduction, each retrieved image is very similar in visual appearance and content meaning to the query image, providing accurate image search results. But when not using the exemplary intention deduction, some of the retrieved images may be vaguely similar but are irrelevant in their semantic meaning, e.g., a no-parking sign returned in a search for a national flag.

Determining User Intention From Reference Stroke Interactions

In some image searches, the intention-modeling engine 204 can use detailed information to determine the user's intention over just the intention deduction made from the single query image by the intention deduction engine 246. This may be due to ambiguity in the query image, or difficulties in finding an example similar to the target image in order to begin a search. For instance, if the query image portrays two people, the intention-modeling engine 204 may not be able to tell which one of the two the user is focused on, or whether the user wants to search for both people at once. In an example, the user has only an image of a boy skiing to submit as a query image, but ultimately wants to find a different type of image with a portrait of the boy and a background of a girl skiing.

The intention refinement engine 238, therefore, allows the user to draw multiple strokes on images as an indication of a region of interest. A stroke is generally a drawn line, or a shape that selects by surrounding a visual object. For the user, operation of the intention refinement engine 238 is quite easy and straightforward: the user draws one or more strokes on regions of images that the user considers "good". The feature combination engine 252 can combine the features designated by the multiple strokes to create a singular clue, cue, or search criterion for finding new images. For example, if the user wants to search for images with both a boy and his mother, but only has portraits of each separately, then the visual feature selection UI 250 allows the user to designate the boy on a first image and the mother on a second image. By specifying strokes on two images, images that have both the boy and mother will appear in the retrieved images display 210. Thus, the intention refinement engine 238 can logically combine features across multiple images.

In one implementation, the user-drawn strokes submitted at the visual feature selection UI 250 are analyzed on two levels. The intention refinement engine 238 seamlessly sends the user strokes to the search configuration engine 264 to let the user tune the search intuitively. First, the retrieval engine 208 considers the region of the image containing the stroke as an indication of the user's attention. In one implementation, the image retrieval system 108 uses this information to collaborate with an automatic attention detection algorithm, to adaptively find a user attention area in the images via the user strokes. The subsequent search is guided by these user attention results. For example, by designating a flower in a larger image, the user emphasizes the flower region, which leads to results that are more coherent with the user's intention of searching specifically for the flower.

Second, if the stroke covers most of one dimension of a salient object (e.g., a depiction of a car, an animal, or a human face), then the stroke is a strong indication of the user's interest in this object. In this case, the intention refinement engine 238 may adjust the intention deduced in the first step at the coarse inference engine 236 so that the search configuration engine 264 may fashion a search schema more suited to the current, more nuanced user intention. For example, once a stroke covers a human face, face recognition will be added to the search schema. The SVM-based ranking engine 274 and the image scoring engine 276 then place images with people who have similar faces at the top of the retrieved images results.

Determining User Intention From Natural User Feedback

At times, even drawing strokes on single or multiple reference images via the intention refinement engine 238 cannot provide sufficient information to obtain accurate enough search results. In such cases, the feedback iterator 240 further leverages user input to allow the user to conduct relevance feedback through the relevant images designator 256, a natural user interface.

Conventional relevance feedback algorithms suffer from insufficient labeled data. Users are easily bored by "positive" and "negative" buttons attached to images. The feedback iterator 240 improves user experience by changing the mechanism of collecting labeled data. Instead of explicitly letting the user label an individual image as "positive" or "negative", the relevant images designator 256 allows the user to add images to a collection of desirable images for the given search, dubbed in one implementation an "I like these" image basket. Dragging-and-dropping "good" images to the "I like these" image basket provides accumulatively better results in the iteratively retrieved image results 210. That is, the resulting search is based on a collection of images and better results can be iteratively reposted each time an image is added.

In one implementation, besides using drag-and-drop of an image into a basket of desirable images, the user can also use easy-to-access buttons in the mini-toolbar shown in FIG. 6 to place images in the "I like these" image basket, e.g., without moving an input device, such as a mouse, very far. The mini-toolbar, such as that shown in FIG. 6, also greatly reduces the mouse movement distance needed to reach other frequently required functionalities related to the image, such as labeling an image as "not wanted" to remove it from the current search, putting the image into the "I like these" collection instead of dragging and dropping, viewing larger images, or tagging the image, if desired.

For the image retrieval system 108, implicit image labels are obtained at the feedback iterator 240 during the natural user feedback, and incrementally improve the search results 210, which in turn stimulate the user to collect more "good" images.

Long-Term Search Memory

It has been observed that the way that different users understand the same image, although different in some ways, often has some correlation. Intuitively, the feedback iterator 240 can make use of this correlation and borrow information from previous queries to assist the current query.

User behavior in the current search session is thus compared with sessions in the historical log data 262, and several similar sessions may be found as matches or approximations. These matches can provide learned patterns 260 and other information for the current search, offering clues about both user intention and final target images. This is similar to accumulatively building an accurate ranking of search results by accumulating user input. Through such a process, the feedback iterator 240 makes use of previous records of other users as well as records of the current user. This greatly reduces the number of operations the user needs to perform to obtain desirable results.

Generating An Image Database

Figure 8:
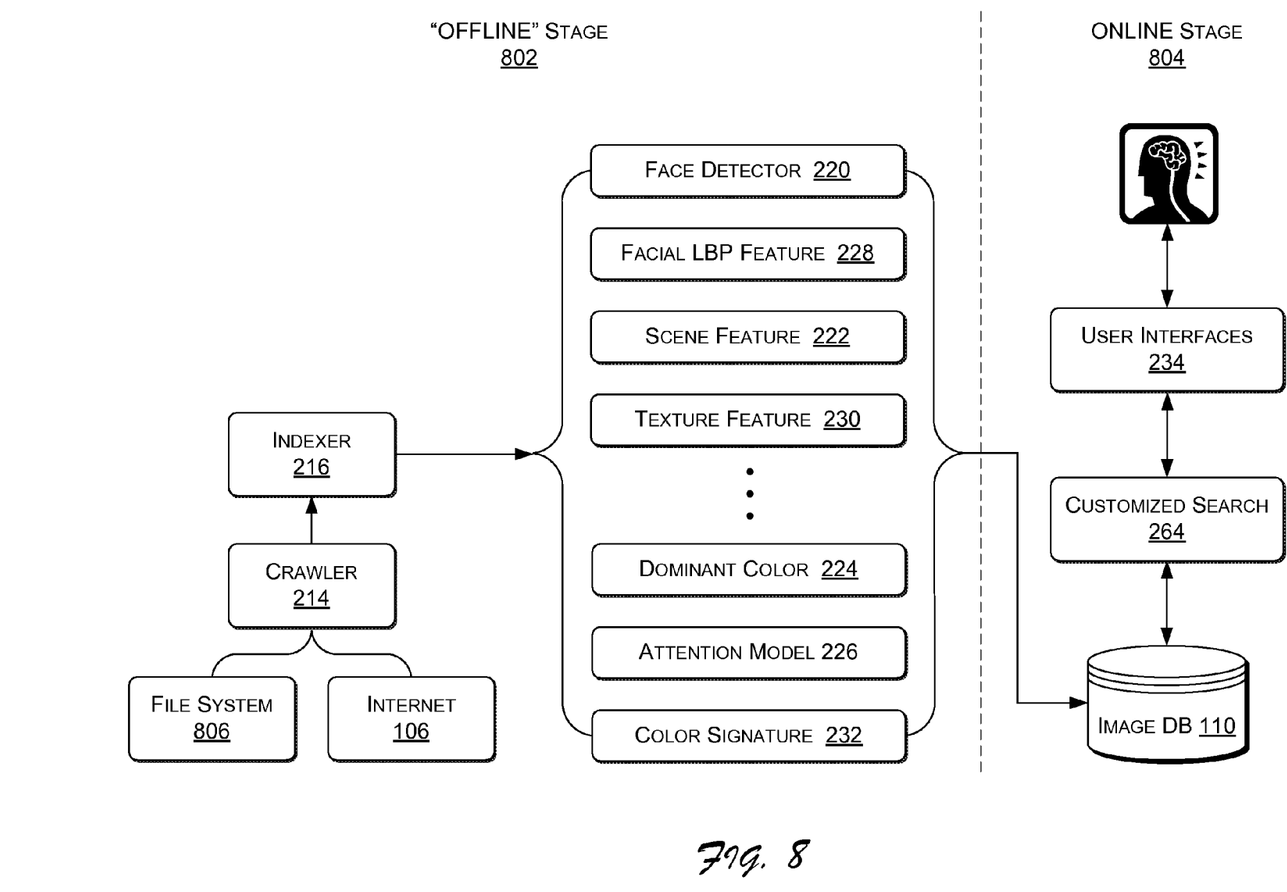
FIG. 8 is a diagram of exemplary offline and online parts of the exemplary image retrieval system.

In one implementation, the exemplary image retrieval system 108 leverages several state-of-the-art computer vision and machine learning technologies. FIG. 8 shows such an implementation of the image retrieval system 108 that uses a two-stage architecture: an offline stage 802 and an online stage 804, i.e., offline indexing and online searching. Offline in this context means that the user is not searching for images online while the image database 110 is being built and indexed, but does not mean that the image database generator 202 itself is necessarily offline with respect to the Internet 106 or other network.

In the offline stage 802, images obtained by the crawler 214, either from the Internet 106, other network, or local file system 806 stored on a hard drive, are added into a queue of the indexer 216 in order for the features extractor 218 to obtain a series of features. The images are then stored to the structured images database 110. Typical features extracted include face detection and alignment data 220, facial Local Binary Pattern features 228, scene descriptors 222, texture features 230, color features 224, image attention model 226, color signature 232, etc.

Online Operation

In the online stage 804, the user interactively operates the image retrieval system 108 through the exemplary UI's generated by the UI engine 234, including the query image input (UI) 242, the visual features selection UI 250, and the relevant images designator (UI) 256. These UI's allow the user to inform the image retrieval system 108 of the user's specific image query intention.

The image retrieval engine 108 automatically configures itself with image features and feature combinations (e.g., via 252, 268, 270). The weight engine 272 assigns a relative importance factor to each feature and feature combination according to the search schema selected by the search method selector 266 for each intention. The intention-modeling engine 204 then takes the user's query image and user feedback as input, and trains the SVM-based ranking engine 274.

Finally, images in the database 110 are ranked according to scores given by the SVM-based ranking engine 274 and the image scoring engine 276, then presented to the user as retrieved image results 210. The user can then give feedback to the system through the feedback iterator 240. With more feedback data, the image retrieval system 108 is automatically updated, and returns refined results 210 to the user. This looping occurs in an iterative manner until the user is satisfied with the current retrieved images results 210.

Interface For Tag-Based Platforms

In one implementation, the image retrieval system 108 includes the interface for tag-based platforms 212. The exemplary image retrieval system 108 can be combined with popular Internet image search engines to complement and boost the accuracy of text-based image searches. Many textual tags apply to multiple items. For example, an "apple" can be a fruit, a computer, or a music recording medium. "Palm" can apply to a type of tree or to the human hand. "Lincoln" can mean a person or a car.

The exemplary image retrieval system 108 not only can filter images brought up via a text query, but can also provide visual uniformity across the retrieved image results 210, when desired. For example, the image retrieval system 108 can ensure that "Lincoln" images returned during a search correspond to the user's intention of finding images of U.S. President Lincoln, and the image retrieval engine 108 can also ensure a return of images that only have a frontal view of Lincoln, for example, as opposed to side-views and other angles. This applies to the other features, for example, the image retrieval system 108 can return images that all include a specified dominant color. Thus, the image retrieval engine 108 can greatly enhance text-based image searching.

Exemplary Methods

Figure 9:
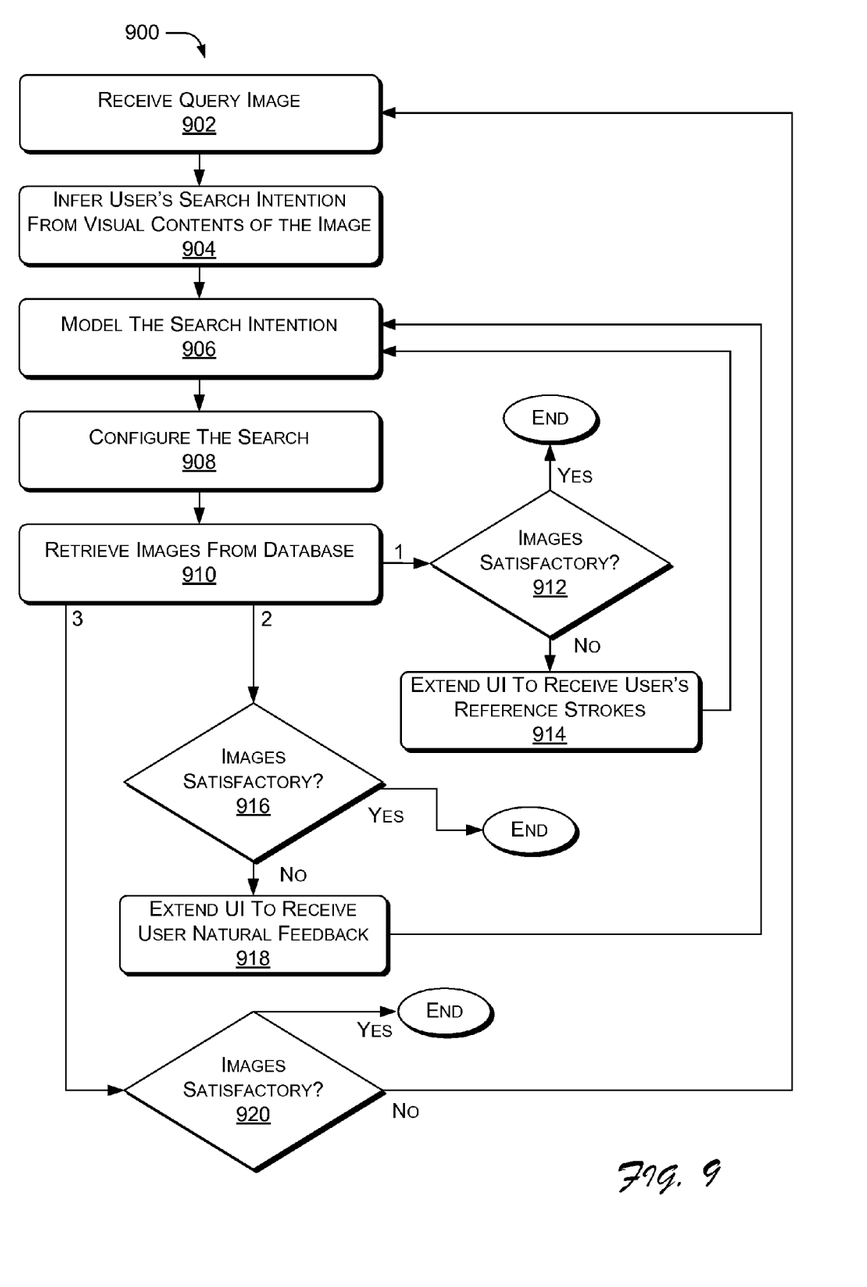
FIG. 9 is a flow diagram of an exemplary method of iteratively refining a user's search intention for interactive image retrieval.

FIG. 9 shows an exemplary iterative method 900 of user intention-based interactive image retrieval. In the flow diagram, the operations are summarized in individual blocks. The exemplary method 900 may be performed by combinations of hardware, software, firmware, etc., for example, by components of the exemplary image retrieval engine 108.

At block 902, a query image is received.

At block 904, the user's search intention is inferred from visual contents of the image. It is worth noting that no text, tags, or metadata are used to characterize the query image. The user's intention is parsed from the query image itself. That is, the visual content of the query image is interpreted on the human perceptual level as high-level semantic information.

At block 906, the user's search intention is modeled. An initial coarse modeling places the user's rough search intention within a limited number of intention categories that can be displayed to the user as a list. In the rare event that the exemplary deduction techniques infer the incorrect intention, the user can designate the correct intention category with a single mouse click.

At block 908, a search is configured to match the intention. That is, different intention categories call for different search techniques. For example, if the user's intention is a portrait-type image, then the search technique includes a face detection algorithm. Relevant image features are also extracted from the query image to be combined into an image search criterion.

At block 910, images are retrieved from a database via the selected search technique and the search criteria fashioned from the extracted visual features of the query image. In one implementation, the method includes training a SVM-based ranking method, which scores the retrieved images with respect to how well they fulfill the modeled search intention.

At branch number "1" and block 912, the user decides whether the retrieved images meet expectations. If so, the method ends, but if not, then the method gathers more user input.

At block 914, another user interface is extended to receive the user's selection of visual features across one or more of the retrieved images. The user may select significant salient objects in one or more images, or may select part of an image that constitutes a visual feature to be used as a search criterion. The method then loops back to refining the intention model, at block 906.

After retrieving an updated set of retrieved images from the database, at branch number "2" and block 916, the user decides whether the retrieved images meet expectations. If so, the method ends, but if not the method again collects further user input.

At block 918, another user interface is extended to receive the user's natural feedback about the latest set of retrieved images. In one implementation, the user drags and drops desirable images into a collection. With each drag, the set of retrieved images updates, via refining the intention model at block 906 and proceeding with reconfiguration of the search and retrieval of a new set of images.

Then, at branch number "3" and block 920, the user again decides whether the retrieved images meet expectations. If so, the method ends, but if not the method iteratively loops back to the beginning at block 902, where one or more of the images of the latest set of retrieved images may be submitted as a query image to be parsed afresh for visual features that capture the user's search intention.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   receiving an image from a user via a first user interface;
   inferring a search intention of the user from visual contents of the image;
   selecting a search method based on the inferred search intention;
   deriving one or more image features from the image as search criteria;
   training a support vector machine (SVM) ranking method with the search method and the one or more derived image features;
   retrieving images from a database by applying the search method and the SVM ranking method;
   receiving one or more image features from the user by operation of a second user interface, the one or more image features manually selected by one or more reference strokes drawn by the user that indicate the one or more image features; and
   retrieving subsequent images from the database at least in part according to the one or more image features indicated by the user.

2. The method as recited in claim 1, further comprising modeling the search intention in a user intention model and selecting the search method based on the modeled search intention.

3. The method as recited in claim 2, wherein the modeling includes categorizing the inferred intention on an intentions list.

4. The method as recited in claim 2, further comprising:
   refining the modeled search intention based on the image features selected via the second user interface; and
   reconfiguring the search method and the search criteria, and retraining the SVM-based ranking method based on the refined modeled search intention and the image features selected at the second user interface;
   wherein the retrieving of the subsequent images from the database is performed in part by applying the reconfigured search method and the retrained SVM ranking method.

5. The method as recited in claim 4, wherein the image features selected by the user's reference strokes are selected from across multiple retrieved images.

6. The method as recited in claim 4, further comprising:
   extending a third user interface to input user feedback with respect to the subsequently retrieved images, wherein the user designates images relevant to the user's search intention;
   refining the modeled search intention based on the user feedback input at the third user interface;
   reconfiguring the search method and the search criteria, and retraining the SVM-based ranking method based on the refined modeled search intention and the user feedback input at the third user interface; and
   retrieving images from the database by applying the reconfigured search method and the retrained SVM ranking method.

7. The method as recited in claim 6, further comprising:
   comparing the user feedback with learned patterns or historical log data to find a similar pattern of user feedback;
   selecting a search criterion or a search method associated with the similar pattern.

8. The method as recited in claim 6, further comprising iteratively:
   receiving user input via one of the first, second, and third user interfaces;
   remodeling the user's search intention based on the user input;
   reconfiguring the search method and the search criteria, and retraining the SVM-based ranking method based on the remodeled search intention;
   retrieving subsequent images by applying the reconfigured search method and search criteria and the retrained SVM-based ranking method; and
   repeating user input via one of the user interfaces based on the subsequently retrieved images.

9. The method as recited in claim 1, further comprising combining derived image features into an image search criterion.

10. The method as recited in claim 1, further comprising weighting each derived image feature with a relative importance.

11. A method, comprising:
crawling images in local files;
remotely crawling images on a network;
indexing the images by visual features parsed from the images, wherein the visual features are indicative of search intentions of a user modeled in an intention model;
creating an images database structured by the visual features;
receiving a query image from the user by operation of a first user interface;
inferring a search intention of the user by extending a second user interface to receive one or more visual features manually selected by reference strokes drawn by the user on the query image; and
retrieving images from the images database according to input obtained at least in part from the second user interface.

12. The method as recited in claim 11, wherein the parsed visual features include one of face detection data, face alignment data, facial Local Binary Pattern (LBP) features data, scene features data, texture features data, color features data, image attention model data, color signature data, or substantially similar visual features.

13. The method as recited in claim 11, further comprising:
modeling the user search intention against a list of user search intentions;
matching a search method to the modeled user search intention;
configuring a search criterion from the visual feature;
searching the image database using the search method and the search criterion;
ranking retrieved images returned by the searching; and
displaying highest ranked retrieved images.

14. The method as recited in claim 13, further comprising:
extending a user interface for the user to designate image features across the displayed images;
remodeling the user search intention based on the designated image features; and
searching and displaying a subsequent set of images from the database based on the remodeled user search intention.

15. The method as recited in claim 14, further comprising:
extending another user interface for collecting user feedback, wherein the user selects images relevant to the user's search intention from the displayed images;
remodeling the user search intention based on the user feedback; and
searching and displaying a subsequent set of images from the database based on the remodeled user search intention.

16. The method as recited in claim 15, further comprising automatically submitting an image from the subsequent set of images as a new query image.

17. The method as recited in claim 15, further comprising iteratively refining the user intention model with each user input applied to each current set of retrieved images, in order to retrieve respective subsequent sets of retrieved images.

18. A system, comprising:
memory;
one or more processors operatively coupled to the memory;
an intention-modeling engine stored in the memory and executable by the one or more processors to receive a query image from a user and iteratively refine a search intention of the user based on visual features of the query image, the visual features indicated at least in part by extending a user interface allowing the user to draw strokes on the query image to designate features and regions of interest by surrounding them with the strokes; and
a retrieval engine stored in the memory and executable by the one or more processors to configure an image search based on a current state of the modeled search intention.

19. The system as recited in claim 18, wherein the intention-modeling engine includes iterative stages for soliciting user input for refining the search intention and wherein the system displays a current set of retrieved images corresponding to the currently modeled search intention.

20. The system as recited in claim 18, further comprising an image database generator, including:
a crawler to find images on local files and on the Internet;
an indexer to build a structured image database that is based on the found images and on visual features of the found images; and
a features extractor to obtain the visual features of the images, including one of face detection data, face alignment data, facial Local Binary Pattern (LBP) features data, scene features data, texture features data, color features data, image attention model data, color signature data, or substantially similar visual features.

* * * * *